Jan. 22, 1929.                                1,699,805
H. M. OCKO
ELECTRICIAN'S TOOL
Filed Oct. 1, 1927

INVENTOR.
Harry M. Ocko
BY Cornelius Zabriskie
ATTORNEYS.

Patented Jan. 22, 1929.

1,699,805

UNITED STATES PATENT OFFICE.

HARRY M. OCKO, OF MONSEY, NEW YORK.

ELECTRICIAN'S TOOL.

Application filed October 1, 1927. Serial No. 223,257.

This invention is a tool intended for use by electricians for preparing wire for splicing, soldering, or otherwise securing the wire to another wire or part. Wire used for commercial electric work is generally insulated by a suitable covering or envelope, and, in many instances, is enclosed within a metallic casing to produce what is known as BX cable. In wiring a house or other building with BX cable or other insulated wire, either solid or stranded, it is necessary to remove the insulation and clean or brighten the wires before splicing them or connecting them to some other part. Several tools are necessary under the present practice to accomplish this result. For example, cutting pliers are employed to cut the wire to the proper length, a wire stripper or knife is then used to strip the insulation from the wire and a knife or other sharp edged implement is thereupon employed to scrape or brighten the wire so that it will make a good electrical contact with the part with which it is to cooperate.

Moreover, in the stripping if wire, the first step of this operation generally consists in cutting through the insulation by the use of a knife or other sharp implement. My experience has been that it is extremely difficult to thus cut the insulation without cutting the wire. This is particularly true when working with stranded wires, where the strands are light and easily cut. It is not uncommon to cut one or more of these strands free during this operation, whereby the efficiency of the wire to carry current is not only reduced but in many instances a dangerous condition may result.

With the foregoing considerations in mind, the object of the present invention is to provide a simple, unitary device comprising a tool capable of carrying out all of the operations to which I have referred in a simple and efficient manner and more satisfactorily than the implements previously employed for this work.

The present invention, therefore, in its broad aspect embodies a tool so formed as to provide for the cutting of a wire to length, the slitting of the envelope of BX cable, and the stripping of the insulation from the wire and the brightening of the wire prior to its connection to another wire or some other cooperating part. All of these functions are performed by a simple, unitary structure, economical to manufacture and thoroughly efficient in the performance of its intended functions.

In its preferred practical form, the tool of this invention has an appearance similar in some respects to pliers. It embodies handles pivoted together and extended beyond the pivot to form cooperating jaws. The contiguous faces of the jaws are cut away for a portion of their length to form sharp coacting edges adapted to serve as wire cutters and beyond these sharp edge portions of the jaws, said jaws are formed to coact flatly with one another and come into face abutting relation to provide a wire twisting portion. This wire twisting portion is extended laterally from one face of the tool to form a thin, keen scraping blade for brightening the wire and this blade, which is divided equally in its extent between the two jaws, is formed at the line of parting between the sections of its length with a circular shaped cutter in the form of a perforation, the edges of which are sharp. The perforation is of a diameter slightly in excess of the commercial wire sizes, but sufficiently small, so that when this cutter operates upon an insulated wire, it will bite well into the insulation without nicking or cutting the wire whereby the portion of the insulation to be removed is sufficiently isolated or severed from the remainder of the insulation as to permit it to be readily withdrawn if tension is placed on the tool while in cooperative relation with the wire as stated.

I preferably also provide the tool with a cutting spur having a sharp edge and tapered to a sharp point, this spur being particularly useful in that it may be introduced through the envelope of a double wire cable to cut the envelope and separate the wires without, however, cutting the insulation of the individual wires enclosed in the envelope. This is an operation difficult to perform with a knife, but very easily performed with a tool having a spur as specified.

Features of the invention, other than those specified, will be apparent from the hereinafter detailed description and claims, when read in conjunction with the accompanying drawings.

The accompanying drawing illustrates one practical embodiment of the invention, but the construction therein shown is to be understood as illustrative, only, and not as defining the limits of the invention.

Figure 1:
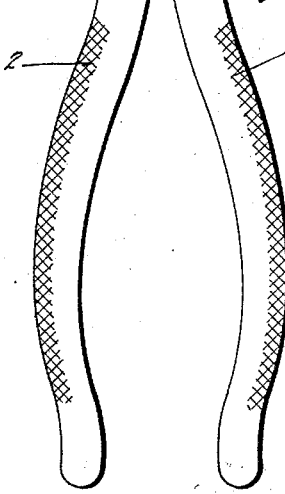
Figure 1 is a side elevation of the tool embodying the present invention.
Figure 2:
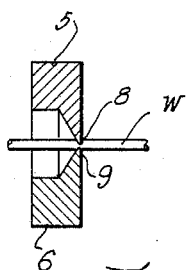
Figure 2 is a section on the line 2—2 of Figure 1.

Referring to the drawings, 1 and 2 designate two handles of any suitable and convenient shape which are secured together by a pivot 3. Beyond the pivot 3, the handles are extended to form jaws 5 and 6. These jaws terminate in a substantially flat end 7, as shown in Figure 1. About midway between the end 7 and the pivot 3, the jaws 5 and 6 are shaped to form coacting cutting edges 8 and 9 adapted to cooperate in the cutting of a wire indicated at $w$ in Figure 2 and beyond these cutting edges, the jaws are made of full thickness and may be extended laterally in one direction, as shown at 10 and 11 to provide fairly broad gripping faces 12 and 13 formed respectively on the contiguous faces of the jaws 5 and 6. Both jaws are, moreover, extended laterally in the opposite direction to form a relatively thin cutting blade 14 having a keen edge 15. The blade 14 is formed conjointly on both jaws as clearly illustrated in Figures 3 and 4, so that one half the length of the blade is carried by each jaw.

These two blade sections separate along the line 16 when the jaws are separated, but when the jaws are closed, the edge 15 of the blade is continuous throughout its whole length. Extending through the blade and disposed equally at opposite sides of the line 16, so as to be formed equally in both sections of the blade, is a countersunk perforation 17. By countersinking this perforation, the edge thereof is rendered sharp, so that there is thereby produced in each section of the blade a semi circular shaped cutter to be used in stripping insulation from wire as will hereinafter be more fully explained.

18 designates a spur carried by and projecting from the outer edge of the jaw 6. This spur is tapered to a point and its edge 19 is sharpened. This spur is preferably formed on the tool of this invention, but it may be omitted without departing from this invention.

The whole construction is preferably forged, machined and ground, so that the cutters will be sharp and efficient in their operations and the parts will properly coact with one another.

The tool of this invention may be employed by electricians working on any form of wire generally used for commercial wiring. For the purpose of illustration, however, I have illustrated its uses in the drawings in connection with the well known BX cable, but I wish it clearly understood that it is not limited in this connection. However, in the preparation of a BX cable, if it be assumed that the metal casing $w^3$ has been removed from the end of the cable, the tool may be used in the following manner.

The spur 18 is first thrust through the envelope $w^2$, so as to penetrate the envelope at both sides thereof and pass between the wires $w'$ which are housed within this envelope. If the cable is now held by one hand while the tool is drawn toward the free end of the cable by the other hand, the sharp edge 19 of the spur will slit the envelope indicated at 20 and this slitted portion may be continued in a direction to the left in Figure 3 until the envelope is slit to the very end of the cable. The slitted portion of the envelope may then be removed leaving the insulated wires which were housed therein uncovered.

Figure 3:
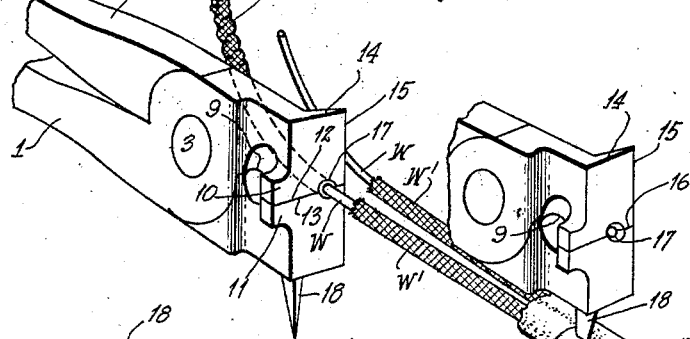
Figure 3 shows the manner in which the tool of this invention may be employed to slit the envelope of double wire cable and to thereby strip the insulation from the wires individually.

If the tool is now brought into a position wherein the semicircular cutters, formed by the perforations 17, will be juxtaposed with the wire, the closing of the jaws, will cause these semicircular cutters to cut into the insulation $w'$ of one of the wires and after the jaws have been fully closed and the cutting of the insulation accomplished, the tool may be drawn to the left as viewed in Figure 3 to strip from the wire the portion $w^4$ of the insulation which has been severed by the cutting operation.

I wish to place particular stress at this point upon the fact that the perforation 17 is made sufficiently large so that the sharp edges of the circular cutter will not engage with the wire $w$. In other words, the diameter of the perforation 17 is greater than the wire $w$, and, accordingly, the wire will not be cut or nicked in any way during the operation of stripping the severed portion of the insulation. This is particularly important when operating upon stranded wire and practical operation of the tool has shown that stranded wire may be stripped in the manner specified without severing any of the fine strands thereof.

Figure 5:
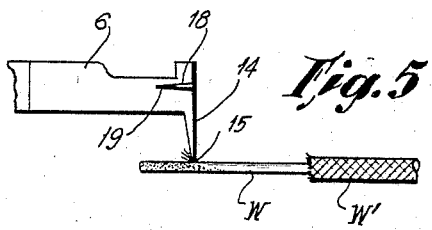
Figure 5 shows the tool in the operation of scraping or brightening a wire.

After both of the wires $w$ have been stripped in the manner stated, the resulting uncovered portions of the wires are scraped and brightened after the manner shown in Figure 5 by scraping said wires with the sharp edge 15 of the blade 14.

Figure 4:
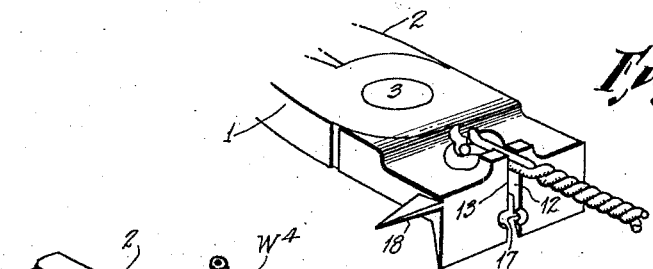
Figure 4 shows the manner in which the present invention is employed to twist two wires together.

When the wires have been scraped and are bright, they may be secured to another wire by twisting, soldering or otherwise. In Figure 4, the manner in which the tool is employed to twist the wires together is clearly shown. The wires to be twisted together are gripped between the gripping faces 12 and 13 and the tool is rotated on its longitudinal axis to unite the wires by twisting.

It will be apparent from the foregoing detailed description of the parts of the tool and its operation that I have produced a unitary device which fulfills all the requirements incident to the preparation of wire for attachment to another wire or other part. The structure is thoroughly efficient in the performance of its intended functions and does better work than the separate tools heretofore employed in this connection. Moreover, the structure is such that it may be made of minimum weight, so that it may be conveniently handled. In this connection, it should be noted that the relatively thin blade 14 is mounted upon the rigid jaws which serve to impart rigidity to the blade and enable it to be made very light. The same is true of the spur 18 which is mounted on the jaw 6 in a manner to back up and support the jaw in such a way that the spur will withstand the strains of long continued use without breaking.

The foregoing detailed description sets forth the invention in its preferred practical form. It will be apparent, however, that mechanical changes may be made, such as by the substitution of equivalents or by the omission of certain elements of the present tool, and I therefore wish it understood that the invention is to be understood as fully commensurate with the appended claims.

Having thus fully described the invention, what I claim as new and desire to secure by Letters Patent is:

1. In an electrician's tool, a pair of handles pivotally connected together and extending beyond the pivot to form coacting jaws, a portion of the length of the contiguous faces of said jaws being shaped to constitute flat gripping faces and the lateral edges of the jaws being tapered and shaped to form laterally projecting knife blade sections on both of said jaws, collectively constituting a knife blade, and coacting semi-circular cutters formed in the contiguous faces of the jaws.

2. In an electrician's tool, a pair of handles pivotally connected together and extending beyond the pivot to form coacting T-shaped jaws having flat ends, a portion of the length of the contiguous faces of said jaws being shaped to constitute flat gripping faces and the lateral edges of the jaws being tapered and shaped to form laterally projecting knife blade sections on both of said jaws, collectively constituting a knife blade, and coacting semi-circular cutters formed in the contiguous faces of the jaws.

In testimony whereof I have signed the foregoing specification.

HARRY M. OCKO.